(12) United States Patent
Kokeguchi

(10) Patent No.: US 7,751,111 B2
(45) Date of Patent: Jul. 6, 2010

(54) DISPLAY ELEMENT

(75) Inventor: Noriyuki Kokeguchi, Kokubunji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 192 days.

(21) Appl. No.: 11/915,842

(22) PCT Filed: Apr. 20, 2006

(86) PCT No.: PCT/JP2006/308270

§ 371 (c)(1),
(2), (4) Date: Nov. 28, 2007

(87) PCT Pub. No.: WO2006/129429

PCT Pub. Date: Dec. 7, 2006

(65) Prior Publication Data

US 2009/0103169 A1    Apr. 23, 2009

(30) Foreign Application Priority Data

Jun. 2, 2005  (JP) .............................. 2005-162440

(51) Int. Cl.
*G02B 1/153* (2006.01)
(52) U.S. Cl. ................... 359/273; 359/275; 359/238
(58) Field of Classification Search ......... 359/273–275, 359/245, 265, 267, 269
See application file for complete search history.

(56) References Cited

U.S. PATENT DOCUMENTS 7,508,009 B2 *   3/2009  Edwards et al. ............. 257/103

FOREIGN PATENT DOCUMENTS

| EP | 1 424 590 A1 | 6/2004 |
| EP | 1 475 656 A1 | 11/2004 |
| JP | 2005-49771 | * 2/2005 |
| WO | WO 2004/049052 A1 | 6/2004 |
| WO | WO 2005/012994 A1 | 2/2005 |

OTHER PUBLICATIONS

European Search Report dated Aug. 19, 2008.

* cited by examiner

*Primary Examiner*—Timothy J Thompson
(74) *Attorney, Agent, or Firm*—Finnegan, Henderson, Farabow, Garrett & Dunner, L.L.P.

(57) ABSTRACT

Provided is a display element which is drivable with simple components and at a relatively low voltage and exhibits high display contrast, enhanced white display reflectance, superior response speed and reduced image unevenness. The display element includes opposing electrodes having therebetween an electrolyte containing silver or a compound having silver in the chemical structure, wherein the opposing electrodes are driven by a drive circuit disposed for each of pixels so that the silver is dissolved and deposited and the opposing electrodes are provided on a plane separate from the drive circuit.

30 Claims, 3 Drawing Sheets

DISPLAY ELEMENT

TECHNICAL FIELD

The present invention relates to electrochemical display elements employing solution deposition of silver.

TECHNICAL BACKGROUND

Recently, along with enhancement of the operating speed of personal computers, the spread of network infrastructures, and increased and lower-priced mass storage, information of documents or image, which were conventionally printed on paper, can be received simply as electronic informations so that opportunities to read such electronic information have increased dramatically.

There were used, as a means for reading electronic information, conventional liquid crystal displays or CRT and recent emission type displays, such as organic electroluminescence displays. Specifically, when electronic information is document information, it is necessary to notice this reading means over a relatively long period of time. It is hard to say that such an action is a kindly means to humans. There are generally known disadvantages of emission type displays such that flickering exhausts human eyes, they are awkward to carry about, the reading posture is restricted, it is necessitated to gaze at a stationary picture plane, and electric power consumption increases when reading over a long time.

As a display means to redeem the foregoing disadvantages is known a (nonvolatile) reflection display which employs external light and does not consume power for image retention. However, based on the reasons below, it is hard to say that such a display provides sufficient performance.

For instance, a system using a polarizing plate such as a reflection type liquid crystal display exhibits a relatively low reflectance up to 40%, resulting in difficulty in displaying whiteness and methods of preparing constituent members are not necessarily simple. A polymer dispersion liquid crystal display requires a relatively high voltage and employment of the difference in refractive index between organic compounds does not result in images with sufficient contrast. A polymer network type liquid crystal display has problems such that it requires a relatively high voltage and a complex TFT circuit to enhance memory. An electrophoretic display element needs a high voltage of more than 10 V, and there is concern of durability of the electrophoretic particles, due to their tendency to coagulate. An electrochromic display element, which can be driven at a relatively low voltage of not more than 3 V, has problems that it is insufficient in color quality of black or colors (such as yellow, magenta, cyan, blue, green and red) and its display cells require complex layer arrangement such as a deposit layer to maintain memory.

There is known, as a display system to overcome these disadvantages of the foregoing systems, an electro-deposition (hereinafter, also denoted simply as ED) system which employs solution deposition of metals or metal salts. The ED system, which can be driven at a relatively low voltage of not more than 3 V, exhibits advantages such as simple cell constitution and being superior in black and white contrast and in black color quality. There were disclosed various methods (as described in, for example, Patent documents 1-3).

As a result of the inventor's detailed study of the technique disclosed in the foregoing patent documents, it was proved that in conventional techniques, the passage of an electric current in a transistor circuit was not so sufficient to speed up driving and the intervening transistor circuit rendered it difficult to maintain a constant distance in the electrolytic bath causing electrolytic deposition, resulting in image unevenness (as described in, for example, Patent documents 4 and 5).

An ED system which differs from the electrochromic system contained metal ions movable in the electrolyte and was proved to produce problems characteristic of an ED system such that a metallic material used for an electrode was insufficient for electrode tolerability, due to electrolytic plating or an electroforming phenomenon in which the metal and metallic ions were involved.

Patent document: U.S. Pat. No. 4,240,716
Patent document 2: Japanese Patent No. 3428603
Patent document 3: JP-A No. 2003-241227 (hereinafter, JP-A refers to Japanese Patent Application publication)
Patent document 4: JP-A No. 2004-309817
Patent document 5: JP-A No. 2004-309946

DISCLOSURE OF THE INVENTION

Problem to be Solved by the Invention

The present invention has come into being in view of the foregoing problems and it is an object of the invention to provide a display element which is drivable with simple components and at a relatively low voltage and exhibits high display contrast, enhanced white display reflectance, superior response speed and reduced image unevenness.

Means for Solving the Problem

The object of the invention was realized by the following constitutions:

1. A display element comprising opposing electrodes having therebetween an electrolyte containing silver or a compound including silver in the chemical structure, wherein the opposing electrodes are driven by a drive circuit disposed for each of pixels so that the silver is dissolved and deposited and the opposing electrodes are provided on a plane separate from the drive circuit.
2. The display element described in 1, wherein at least one of the opposing electrodes is electrically connected to the drive circuit through a contact hole.
3. The display element described in 1 or 2, wherein the drive circuit has a pixel switching means.
4. The display element described in any one of 1 to 3, wherein the drive circuit has a current controller to control a current passing between the opposing electrodes.
5. The display element described in any one of 1 to 4, wherein the drive circuit has a potential controller to control a potential between the opposing electrodes.
6. The display element described in any one of 1 to 5, wherein the drive circuit has a means for specifying rewriting.
7. The display element as described in any one of 1 to 6, wherein the drive circuit has a power cutoff means.
8. The display element described in any one of 1 to 7, wherein the display element has a porous white scattering layer between the opposing electrodes.
9. The display element described in any one of 1 to 8, wherein a distance between the opposing electrodes is not less than 1 µm and not more than 40 µm.
10. The display element described in any one of 1 to 9, wherein an area of a black image per pixel is from 1.3 to 3.5, based on an area of an opposing electrode opposite to an image observation side being 1.
11. The display element described in any one of 1 to 10, wherein the electrolyte comprises at least one compound represented by formula (1) or (2) and at least one compound represented by formula (3) or (4):

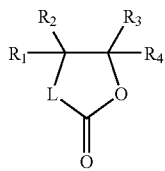

formula (1)

wherein L is an oxygen atom or $CH_2$; $R_1$ through $R_4$ are each a hydrogen atom, an alkyl group, an alkenyl group, an aryl group, a cycloalkyl group, an alkoxyalkyl group or an alkoxy group;

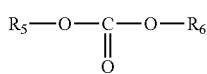

formula (2)

wherein $R_5$ and $R_6$ are each a hydrogen atom, an alkyl group, an alkenyl group, an aryl group, a cycloalkyl group, an alkoxyalkyl group or an alkoxy group;

formula (3)

wherein $R_7$ and $R_8$ are each a substituted or unsubstituted hydrocarbon group, or $R_7$ or $R_8$ combine with each other to form a nonaromatic S-containing ring, provided that atoms adjacent to S are not S;

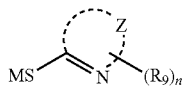

formula (4)

wherein M is a hydrogen atom, a metal atom or a quaternary ammonium; Z is a nitrogen-containing heterocyclic ring; n is an integer of 0 to 5; $R_9$ is a hydrogen atom, a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxycarbonyl group, a carboxyl group, a carbonyl group, a sulfonyl group, an amino group, a hydroxy group or a heterocyclic group, provided that when n is 2 or more, $R_9$s may be the same or different or may combine to form a condensed ring.

12. The display element described in any one of 1 to 11, wherein the display element satisfies equation (1):

$$0 \leq [X]/[Ag] \leq 0.01 \quad \text{equation (1)}$$

wherein [X] is a molar concentration (mole/kg) of halogen ions or halogen atoms contained in the electrolyte and [Ag] is a total molar concentration (mole/kg) of silver contained in the electrolyte or silver included in the compound including silver in its chemical structure.

13. The display element as described in any one of 1 to 12, wherein the opposing electrodes are driven so that a blackened silver is deposited by applying a voltage more than a deposition overvoltage and deposition of the blackened silver is continued by applying a voltage not more than the deposition overvoltage.

EFFECT OF THE INVENTION

The present invention can provide a display element which is constituted of simple components, is drivable at a relatively low voltage and exhibits high display contrast, enhanced white display reflectance, superior response speed and reduced image unevenness.

DESCRIPTION OF NUMERICAL DESIGNATIONS

Figure 1:
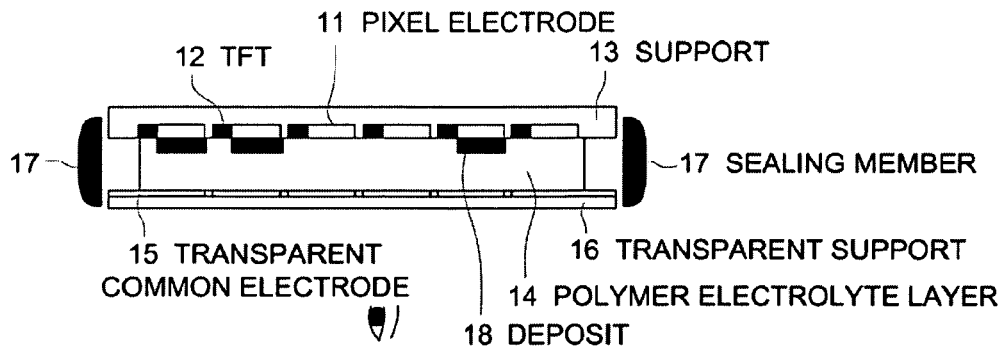
FIG. 1 is a sectional view of a display element using a conventional TFT.

21: Pixel electrode
22: ED display section
24: Com electrode
34: TFT board
42: Gate line
43: Source line
45: Gate electrode
46: Source electrode
47: Drain electrode
48 Semiconductor layer

PREFERRED EMBODIMENTS OF THE INVENTION

There will be detailed preferred embodiments of the invention.

As a result of extensive study in light of the problems described above, the inventors of this application discovered that a display element comprises opposing electrodes having between them an electrolyte layer containing silver or a compound including silver in its chemical structure, wherein the opposing electrodes are driven by using a drive circuit disposed for each pixel so that silver is dissolved and deposited, and the opposing electrodes are provided on a plane separate from a plane of the drive circuit, whereby a display element which is constituted of simple components, is drivable at a relatively low voltage and exhibits high display contrast and white display reflectance, enhanced driving speed and reduced image unevenness, and the present invention has come into being.

In the following, the invention will be described in detail.

The display element of the invention is one of an ED type system which comprises opposing electrodes having therebetween an electrolyte containing silver or a compound including silver in its chemical structure and the opposing electrodes are driven so as to results in dissolution and deposition of silver.

FIG. 1 shows a conventional example. In the conventional technology, a transistor circuit is disposed on the same plane as the pixel electrode and the transistor circuit, specifically its channel sectional area cannot account for a large area, so that the passage of an electric current in a transistor circuit is not sufficient to enhance the driving speed and the intervening transistor circuit rendered it difficult to keep a constant distance in the electrolytic bath causing electrolytic deposition, producing problems in image unevenness, such as density unevenness at the periphery of the image.

According to the constitution of the invention, the pixel circuit can account for a large area, whereby the channel sectional area also accounts for a large area and various circuit functions for pixel driving can also be provided. Further, the sectional distance between the opposing electrodes and the electrolyte can be uniformly kept, resulting in reduced density unevenness in the periphery.

According to the constitution of the invention, an electrode thickness of the pixel circuit side can be designed to be sufficient, resulting in reduced electrode deterioration characteristic to the ED system, which is not caused in the electrochromic system.

Silver or Compound Including Silver in its Chemical Structure:

The term "silver or compound including silver in its chemical structure", according to the present invention, is a general term referring to a compound such as silver oxide, silver sulfide, metallic silver, colloidal silver particles, silver halide, silver complex compounds, or silver ions, and phase states such as a solid state, a dissolved state in a liquid, or a gaseous state, as well as charge states such as a neutral state, an anionic state, or a cationic state are not particularly specified.

Basic Constitution of Cell

Figure 2:
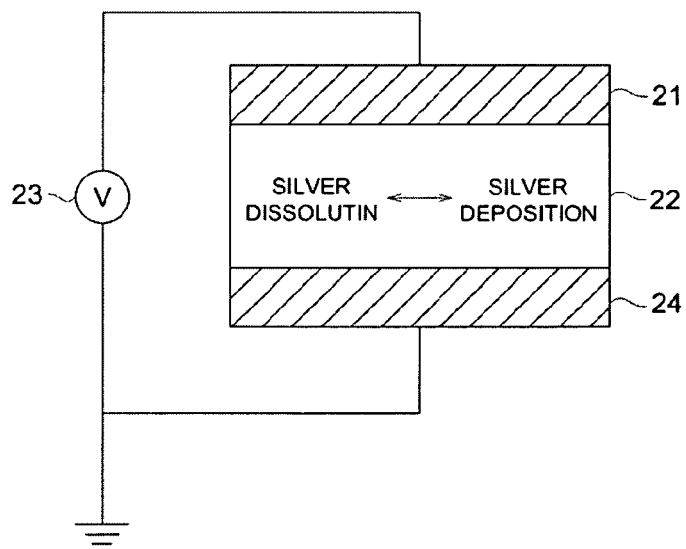
FIG. 2 illustrates a sectional view showing the basic constitution of a display element of the invention.

FIG. 2 illustrates a sectional view showing the basic constitution of a display element of the invention.

As shown in FIG. 2, the display element of the invention holds electrolyte layer 22 between pixel electrode 21 and Com electrode 24, which are a pair of opposing electrodes. In the display element, the display state is varied utilizing differences in optical properties of the silver-containing compound such as transmission and absorption of light. The optical properties of silver-including compound is changed by dissolving silver in electrolyte layer 22 or depositing silver from electrolyte layer 22 by applying voltage or current through the paired electrodes 1 from power source 23.

Figure 3:
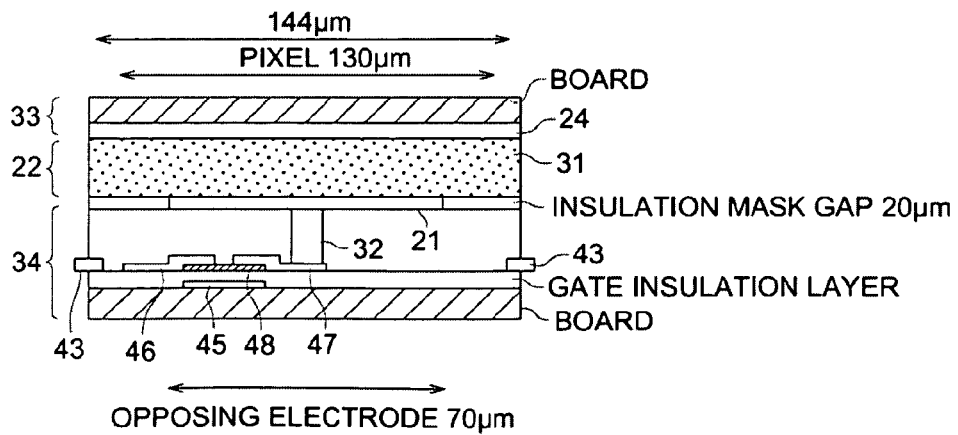
FIG. 3 is a sectional view showing a cell structure of an ED display element of the invention.

FIG. 3 is a sectional view showing a cell structure of an ED display element of the invention.

The display element of the invention is constituted of a TFT board 34, transparent electrode 33 and ED display section 22 sandwiched between both boards.

Figure 4:
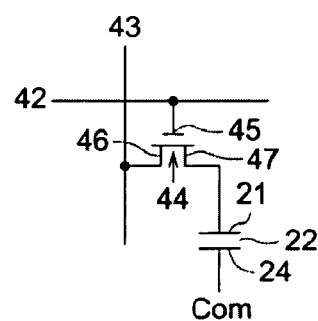
FIG. 4 is a basic circuit diagram of a TFT voltage-driving an ED display element of the invention.

In the TFT board 34, there are wired plural source lines 43 and plural gate lines not shown (corresponding to 42 in FIG. 4). The region surrounded by source line 43 and the gate line (42 in FIG. 4) corresponds to a single pixel. In the individual pixel, a single switching TFT is formed of a gate electrode 45 connected to the gate line (42 in FIG. 4), a source electrode 46 connected to the source line, drain electrode 47 and semiconductor layer 48. The drain electrode 47 is connected to the pixel electrode 21 through a contact hole. The pixel electrode 21 opposes Com electrode 24 through ED display section 22 composed of an ion-conductive white scattering layer 31.

The distance between pixel electrode 21 and the Com electrode 24 as opposing electrodes is not less than 1 μm and not more than 40 μm. The area of a blackened image is preferably not less than 1.3 and not more than 3.5, based on the area of pixel electrode 21 being 1. An area ratio of more than 3.5 forms a dotted black image, rendering it difficult to display a low reflectance black, while an area ratio of less than 1.3 easily causes bleeding between images.

In the invention, the TFT and ED display section 22 are not on the same surface so that ED display section 22 can account for the overall surface of the display element arrays, resulting in superior visibility and a white display with enhanced reflectance. A large opposing area of pixel electrode 21 and Com electrode 24 results in reduced display unevenness. A large TFT area renders it feasible to constitute a circuit with a large current capacity and can realize a display element with a prompt switching speed.

There will be described the action of the display element of the invention.

Application of a voltage to gate electrode 45 from an external drive circuit through the gate line (42 in FIG. 4) renders the semiconductor layer 46 to be on-state, resulting in conduction between the source electrode and drain electrode 47. Since a voltage (for example, Vss) is externally applied to source electrode 46 through source line 43, the drain electrode 47 becomes a voltage of Vss. The Vss voltage is applied to the pixel electrode 21 through the contact hole. On the other hand, when Com electrode 24 is connected to the ground potential, a voltage of Vss is applied between pixel electrode 21 and Com electrode 24, depositing silver and rendering a black display feasible.

When applying the ground potential to the gate electrode, semiconductor layer 48 becomes an off-state and source electrode 46 becomes non-conductive to drain electrode 47, resulting in lowered voltage of the drain electrode so that no voltage is applied between pixel electrode 21 and Com electrode 24, depositing no blackened silver and forming a white display.

Application of a voltage with opposite polarity to the time of depositing blacked silver dissolves deposited silver, and being returned to white display.

Drive Circuit

There will be described a TFT circuit to drive the ED display element of the invention.

FIG. 4 is a basic circuit diagram.

The ED display element is provided with a gate line drive circuit to choose the respective pixels and a source line drive circuit (not shown in the figure) on the end side of gate line 42 and the end side of source line 43, respectively, and there is also provided a signal control section (not shown in the figure) to control the gate line drive circuit and the source line drive circuit. A gate signal is applied to the prescribed gate line 42 by the gate line drive circuit controlled by the signal control section. The gate signal is applied to gate electrode 45 of TFT 44 for switching and TFT 44 becomes on-state. A source signal applied to the prescribed source line 43 is applied from source electrode 46 of TFT 44 to the pixel electrode 21 through drain electrode 47 and a source signal voltage is applied to ED display section 22 with being grounded to Com electrode 24, whereby blackened silver is deposited on ED display section side of electrode 24, rendering a black display feasible.

Figure 5:
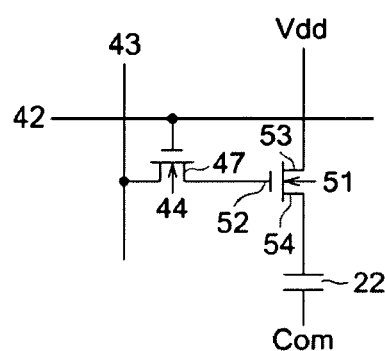
FIG. 5 is a circuit diagram of a TFT current-driving an ED display element of the invention.

FIG. 5 performs displaying by a current drive circuit, which is different from one driven by a voltage drive circuit, as shown in FIG. 4. In addition to TFT 44 used for switching, a power supply line (Vdd) formed along source line 43 and TFT 51 to supply a current to display section 22 through the power supply line (Vdd) are formed in the individual pixel. Gate electrode 52 of TFT 51, source electrode 53 of TFT 51 and drain electrode of TFT 51 are each connected to drain electrode 46 of TFT 44, the power supply line (Vdd) and display section 22, respectively.

Such a current drive circuit can supply a greater current to display section 22, compared to the one shown in FIG. 4, whereby an oxidation reduction reaction can be promptly performed. In this embodiment, it is preferred to perform power supply divided to two kinds, for example, 1.5 V for a black display and −1.5 V for a white display to the power supply line (Vdd). A flame rate gradation method is suitable for performing gradation display.

TFT 44 and TFT 51 are each an N-type TFT, namely a TFT having an electron as a carrier so that a power supply line (Vdd) is not necessarily formed along source line 43 but may be formed along gate line 42, which may be either one so as to supply power to an individual pixel.

Figure 6:
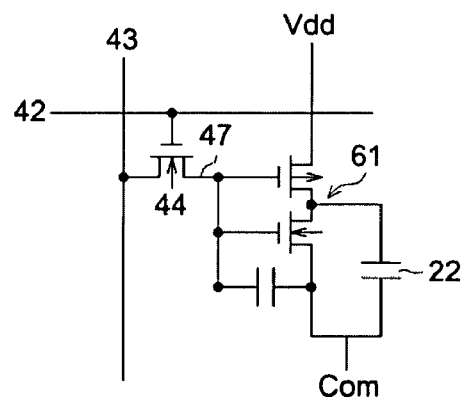
FIG. 6 is a circuit diagram of a TFT current-driving an ED display element by using a voltage control means.

FIG. 6 is a circuit diagram provided with a switching means and a potential control means for the individual pixel in the current drive circuit, as described in the foregoing embodiment. Specifically, N-type TFT 44 used for switching is used as a switching means and CMOS 61 comprised of a p-type TFT and an N-type TFT is used as a potential control means. The input end of CMOS 61 is connected to drain electrode 47 of TFT 44, while the output end of CMOS 61 is connected to display section 22. Thereby, an oxidation-reduction reaction can be promptly performed and gradation display by a voltage gradation method can be performed by a potential control means. Since CMOS 61 is used in this embodiment, a polysilicone is used in the semiconductor layer of TFT (48 in FIG. 3). Accordingly, it results in advantageous effects such as reduced electric power consumption or an integrated circumferential drive circuit. The semiconductor layer of TFT 44 for switching use (48 in FIG. 3) may also be made of a polysilicone.

Figure 7:
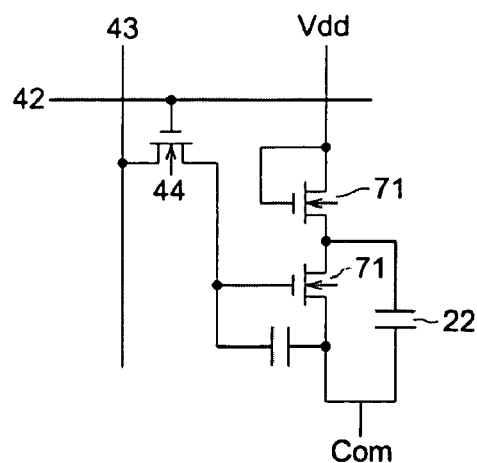
FIG. 7 is a circuit diagram of a TFT using CMOS as the voltage control means of FIG. 6.

FIG. 7 is also a circuit diagram provided with a switching means and a potential control means for the individual pixel. The difference from FIG. 6 is that the potential control means employs two P-type or N-type TFTs, not CMOS(N-type in FIG. 7). Accordingly, it can be manufactured by using a-Si in the semiconductor layer without using a polysilicone, resulting in advantages such as easiness in manufacturing. All of these TFTs formed for the respective pixels are an N-type TFT and a-Si can be used for the semiconductor layer, so that an increase of manufacturing steps can be controlled, as compared to a pixels of mixed P-type and N-type TFTs.

Figure 8:
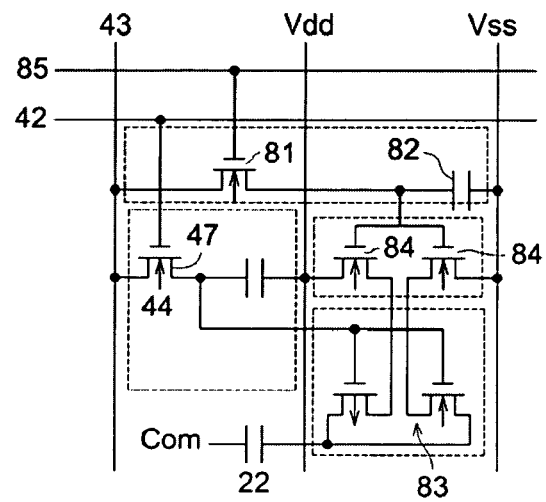
FIG. 8 is a circuit diagram of a TFT which current-drives an ED display element by using a means for specifying rewriting, a power cutoff means and a potential controlling means.

FIG. 8 shows a current drive circuit, as set forth in the foregoing embodiments, which is provided with a switching means, a means for specifying rewriting, a potential controlling means and a power cutoff means. Specifically, the switching means uses TFT 44 used for switching, the means for specifying rewriting uses N-type TFT 81 and condenser 82, the potential controlling means uses CMOS 83 and the power cutoff means uses two N-type TFTs 84. The gate electrode of TFT 81 is connected to word line 85 running parallel to gate line 42, the source electrode of TFT 81 is connected to source line 43, while the drain electrode of TFT 81 is connected to condenser 82 and also to the gate electrode of each of TFT 84. The source electrode of TFT 84 is connected to either one of two power supply lines (Vdd) and (Vss). The drain electrode of TFT 84 is connected to either one of a P-type TFT and a N-type TFT constituting CMOS 83, the input end of CMOS 83 is connected to drain electrode 47 of TFT 44, while the output end of CMOS 83 is connected to display section 22. Thereby, necessity of rewriting is specified in the individual pixel chosen by word line 85 and source line 43. Power supply is performed in a pixel which is specified as rewriting being required and power supply is not performed in any pixel which is specified as rewriting being unnecessary.

In the case of an ED display element, which has a so-called display memory property, when display of the corresponding pixel is the same as the one previously chosen, maintaining display as such leads to reduction of electric power consumption. Accordingly, a means for specifying rewriting and a power cutoff means are provided in the individual pixel and when there is no change between the display state previously chosen and the one presently chosen, rewriting being unnecessary is specified by a means for specifying rewriting and power supply is cut off in the power cutoff means. When there is a change between the display state previously chosen and one presently chosen, rewriting being necessary is specified by a means for specifying rewriting and power supply is not cut off in the power cutoff means. Reduction of electric power consumption in the ED display element can thus be realized. Since CMOS is used in this embodiment, a polysilicone may be used in the semiconductor layer of TFT.

Figure 9:
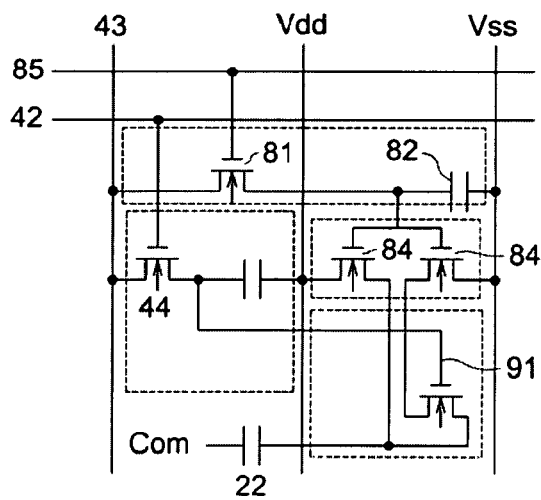
FIG. 9 is a circuit diagram of a TFT using a N-type TFT as the potential controlling means of FIG. 8.

FIG. 9, similar to FIG. 8 is a circuit diagram provided with a switching means, a means for specifying rewriting, a potential controlling means and power cutoff means. The difference from FIG. 8 is that the potential control means employs P- or N-type TFT 91 but not CMOS 83 (an N-type is shown in the figure). Therefore, the semiconductor layer of the TFT can be manufacture by using a-Si without using a polysilicone, leading to easier manufacturing. All of the TFTs formed for the respective pixels are an N-type TFT and a-Si can be used for the semiconductor layer, so that manufacturing steps can be minimized, as compared to a pixel mixed with P-type and N-type TFTs.

In the circuit diagram shown in FIGS. 5-9, power supply lines (Vdd) and (Vss) are shown, the end of which is connected to a power source. It is a concern that the end farther from the power source results in lowered power supply capability. Accordingly, lowering of power supply capability may be prevented by connecting both ends of the power supply line or by connecting adjacent power supply lines through at least one interconnecting point. If the interconnecting point is in a ladder form, power supply is feasible even when one of the power supply wires is broken.

Porous White Scattering Layer

A porous white scattering layer relating to the invention is formed by coating an aqueous mixture of an aqueous polymer which is substantially insoluble in an electrolytic solvent and a white pigment, followed by drying.

Examples of white pigments include titanium dioxide (an anatase type or a rutile type), barium sulfate, calcium carbonate, aluminum oxide, zinc oxide, magnesium oxide, zinc hydroxide, magnesium hydroxide, magnesium phosphate, magnesium hydrogenphosphate, alkaline earth metal salts, talc, kaolin, zeolite, acid clay, glass, as well as organic compounds such as polyethylene, polystyrene, acryl resins, ionomers, ethylene-vinyl acetate copolymer resins, benzoguanamine resins, urea-formalin resins, melamine-formalin resins and polyamide resins. These particles may be used singly or in combination. Also, the particles may contain voids to alter the refractive index.

Of these white pigment particles, there are preferably employed titanium dioxide, zinc oxide, and zinc hydroxide. More preferably are employed titanium dioxide which has been subjected to a surface treatment employing inorganic oxides (e.g., $Al_2O_3$, AlO(OH), $SiO_2$). In addition to such surface treatments, titanium dioxide particles may be subjected to a treatment employing organic compounds such as trimethylolethane or triethanolamine acetic acid salts.

Of these white particulate materials, titanium oxide or zinc oxide are preferably used in terms of prevention of coloring at a relatively high temperature or reflectance of the display element which is influenced by the refractive index.

As aqueous polymer which is substantially insoluble in an electrolytic solvent are cited a water-soluble polymer and a polymer dispersed in an aqueous solvent.

Examples of a water-soluble polymer include proteins such as gelatin and its derivatives; natural compounds including polysaccharides, such as cellulose derivatives, starch, gum arabic, dextran, pullulan and carageenan; and synthetic polymer compounds such as polyvinyl alcohol, polyvinyl pyrrolidone, a acrylamide polymer and their derivatives. Gelatin derivatives include acetylated gelatin and phthalated gelatin, polyvinyl alcohol derivatives include an end alkyl-modified polyvinyl alcohol and an end mercapto-modified polyvinyl alcohol, and cellulose derivatives include hydroxyethyl cellulose, hydroxypropyl cellulose and carboxymethyl cellulose. There are also usable compounds described in Research disclosure or JP-A No. 64-13546 at page 71-75 and highly water-absorbing polymers described in U.S. Pat. No. 4,960,681 and JP-A No. 62-245260, such as homopolymers of vinyl monomer containing —COOM or —$SO_3M$ (in which M is a hydrogen atom or an alkali metal) and copolymers of the foregoing monomers or those of these monomers and other vinyl monomers (e.g., sodium methacrylate, ammonium methacrylate, potassium methacrylate). These binders may be used singly or in combination.

In the invention are preferably used gelatin and its derivatives, and polyvinyl alcohol and its derivatives.

Examples of a polymer dispersible in an aqueous solvent include natural rubber latex and latexes of styrene butadiene rubber, butadiene rubber, nitrile rubber, chloroprene rubber and isoprene rubber; and thermosetting resins dispersible in an aqueous solvent, such as polyisocyanate, epoxy, acryl, silicone, urethane, urea, phenol, formaldehyde, epoxy-polyamide, melamine and alkyd resins and vinyl resin. Of these polymers, an aqueous polyurethane resin, as described in JP-A 10-76621, is preferred.

The expression, being substantially insoluble in electrolytic solvent is defined as an solution amount per 1 kg of electrolytic solvent being not less than 0 g and not more than 10 g at a temperature of from −20° C. to 120° C. The solution amount can be determined by a weight measurement method or a component quantitative measurement method by liquid chromatography or gas chromatography.

The aqueous mixture of an aqueous compound and a white pigment is preferably in the form of a white pigment dispersed in water. The volume ratio of aqueous compound/white pigment is preferably in the range from 1 to 0.01 and more preferably from 0.3 to 0.05.

The aqueous mixture of an aqueous compound and a white pigment may be coated at any position on a constituting component between opposing electrodes of the display element but is provided preferably on the surface of at least one opposing electrode. Methods of providing to the medium include a coating system and a liquid-spraying system, including a spray system through gas phase, such as a system of jetting liquid droplets by employing vibration of a piezoelectric element, for example, a ink-jet head of a piezo-system, a bubble jet system (trade name) of jetting liquid droplets by using a thermal head employing bumping, and a spray system of spraying liquid by air pressure or liquid pressure.

A coating system can be chosen from commonly known coating systems, including, for example, an air doctor coater, a blade coater, a rod coater, a knife coater, squeeze coater, a dipping coater, a reverse roller coater, a transfer roller coater, a curtain coater, a double roller v, a slide hopper coater, a gravure coater, kiss roller coater, a bead coater, a cast coater, a spray coater, calender coater, and an extrusion coater.

An aqueous mixture of an aqueous compound and a white pigment which is provided on a medium may be dried by any method of evaporating water. Examples thereof include heating by a heat source, a heating method of using infrared light and a heating method employing electromagnetic induction. Distillation of water may be conducted under reduced pressure.

In the invention, the expression "porous" is referred to as follows: the foregoing aqueous mixture of an aqueous compound and a white pigment is coated onto an electrode and dried to form a white scattering material, onto which an electrolytic solution containing silver or a compound containing silver in the molecule is provided and sandwiched by opposing electrodes and when an electric potential difference is applied between the opposing electrodes to cause a solution and deposition reaction of silver, ionic species are movable and penetrable between the electrodes.

In the display element of the invention, it is preferred to perform a hardening reaction of the aqueous compound by a hardening agent during or after coating or drying of the aqueous mixture.

As a hardening agent usable in the invention are cited hardening agents described in, for example, U.S. Pat. No. 4,678,739, col. 41; U.S. Pat. No. 4,791,042; JP-A Nos. 59-116655, 62-245261, 61-18942, 61-249054, 61-245153, and 4-218044. Specific examples thereof include an aldehyde hardener, an aziridine hardener, an epoxy hardener, a vinylsulfone hardener [e.g., N,N'-ethylene-bis (vinylsulfonylacetoamido)ethane], a N-methylol hardener [e.g., dimethylol urea], boric acid and a polymeric hardener (compounds described in JP-A 62-234157). In case when using gelatin as an aqueous compound, a vinylsulfone hardener or chlorotriazine hardener is preferably used singly or in combination. In the case of using a polyvinyl alcohol, boric acid or metaboric acid is preferred.

These hardening agents are used preferably in amount of from 0.001 to 1 g per g of aqueous compound, and more preferably from 0.005 to 0.5 g. It is feasible to control humidity during the heat treatment or a hardening reaction to enhance film strength.

Electronic Insulation Layer

The electronic insulation layer relating to the invention may be any layer exhibiting a combination ionic conductivity and electronic insulation property. Examples thereof include a solid electrolyte membrane such a film of a polar group-containing polymer or its salt, a coagulated electrolyte membrane formed of a highly electronic-insulating porous membrane bearing an electrolyte within the pores, a porous polymer membrane having pores and porous material of an inorganic material exhibiting a low specific dielectric constant, such as a silicon-containing compound.

Formation of a porous membrane can employ commonly known methods, including a sintering method (or a fusion method, in which polymer microparticles or inorganic particles are partially fused together with a binder and employing pores formed between particles), a subtraction method (in which a layer composed of a solvent-soluble organic or inorganic material and a solvent-insoluble binder is formed and the organic or inorganic material is dissolved by a solvent to form pores), a foaming method of allowing a polymeric material to foam by heating or degassing, a phase conversion method of allowing a mixture of polymers to be phase-separated by using a good solvent and a poor solvent, and a radiation exposure method of exposing to various kinds of radiations to form pores. Specifically, there are cited electronic insulation layers described in JP-A Nos. 10-30181 and 2003-107626, JP-A No. 7-95403, and Japanese Patent Nos. 2635715, 2849523, 2987474, 3066426, 3464513, 3483644, 3535942 and 3062203.

Bound Transparent Conductive Particle Layer

In the display element of the invention, at least one of the opposing electrodes preferably has a layer containing transparent conductive microparticles, which are bound. As microparticles to form the layer containing transparent conductive microparticles are usable microparticles of polymethyl methacrylate, cellulose, polycarbonate, titanium oxide, silicon oxide, zinc oxide, alumina, or zeolite. Examples of conductive microparticles that are capable of forming an electrode membrane by them include Sn-doped indium oxide (ITO), antimony-doped tin oxide (ATO), fluorine-doped tin oxide (FTO) and aluminum-doped zinc oxide, and ITO-, ATO- or FTO-coated titanium oxide particles. The expression, conductive refers to a powder resistance of 0.01 to 100 Ωcm, and preferably 0.01 to 10 Ωcm under a pressure of 10 MPa.

In the invention, the average particle size of the microparticles is preferably from 5 nm to 10 μm, and more preferably from 20 nm to 1 μm. The specific surface area, based on the simple BET method, is preferably from $1\times10^{-3}$ to $1\times10^{2}$ m$^{2}$/g and more preferably from $1\times10^{3\,1\,2}$ to $1\times10^{2}$ m$^{2}$/g. The microparticles may be in any form, such as an amorphous form, needle form or a spherical form.

Binding microparticles to form a transparent conductive membrane can employ a sol-gel method and, for instance, membrane formation of ITO or ATO is feasible by the method described in 1) Journal of the Ceramic Society of Japan 102, p 200 (1994); 2) Yogyo-kyokai-shi 90 [4] p 157; and 3) J. of Non-Cryst. Solids 82, 400 (1986). Alternatively, using a sol solution dispersing non-conductive microparticles such as spherical PMMA particles, conductive layer is formed on the surface of the microparticles by a sol-gel method to form a transparent conductive membrane. The pores formed by microparticles or by an electrode board and microparticles have the foregoing transparent conductive membrane as an outer shell, whereby the substantial surface area of the electrode is increased.

Figure 10:
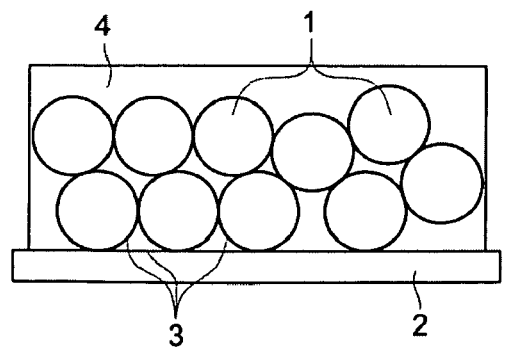
FIG. 10 is a model diagram showing an example of a porous electrode of the invention.

FIG. 10 is a model diagram showing an example of a porous electrode of the invention.

In FIG. 10, microparticles 1 having an outer shell of a conductive or transparent conductive membrane are bound to board 2 to form a layer and a vacancy formed by the electrode board and the microparticles has also transparent conductive membrane 3 as a shell. Electrolyte 14 exists in such a form of filling vacant portions formed by the microparticles or by the electrode board and the microparticles.

Binding of microparticles refers to the state exhibiting a resistance of not less than 0.1 g, preferably not less than 1 g, when measuring a fixing strength of the microparticle layer by a continuous-loading type surface tester (for example, a scratch tester).

In the display element of the invention, the electrolyte preferably contains at least one compound represented by the afore-described formula (1) or (2) and at least one compound represented by the afore-described formula (3) or (4).

First, there will be described a compound represented by formula (1).

In formula (1), L is an oxygen atom or CH$_{2}$ and R$_{1}$-R$_{4}$ are each a hydrogen atom, an alkyl group, an alkenyl group, an aryl group, a cycloalkyl group, an alkoxyalkyl group or an alkoxy group.

Examples of an alkyl group include methyl, ethyl, propyl, isopropyl, t-butyl, pentyl, hexyl, dodecyl, tridecyl, tetradecyl and pentadecyl; examples of an aryl group include phenyl, and naphthyl; examples of a cycloalkyl group include cyclopentyl and cyclohexyl; examples of a alkoxyalkyl group include β-methoxyethyl and γ-methoxypropyl; examples of an alkoxy group include methoxy, ethoxy, propyloxy, pentyloxy, octyloxy, and dodecyloxy.

Specific examples of a compound of formula (1) are shown below but in the invention, they are not limited to these.

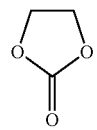

1-1

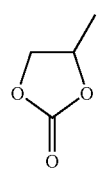

1-2

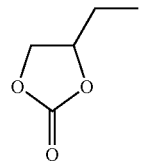

1-3

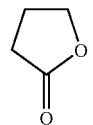

1-4

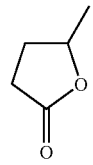

1-5

Next, there will be described a compound represented by formula (2).

In the formula (2), R$_{5}$ and R$_{6}$ are each a hydrogen atom, an alkyl group, an alkenyl group, an aryl group, a cycloalkyl group, alkoxyalkyl group or an alkoxy group.

Examples of an alkyl group include methyl, ethyl, propyl, isopropyl, t-butyl, pentyl, hexyl, dodecyl, tridecyl, tetradecyl and pentadecyl; examples of an aryl group include phenyl, and naphthyl; examples of a cycloalkyl group include cyclopentyl and cyclohexyl; examples of a alkoxyalkyl group include β-methoxyethyl and γ-methoxypropyl; examples of an alkoxy group include methoxy, ethoxy, propyloxy, pentyloxy, octyloxy, and dodecyloxy.

Specific examples of a compound of formula (2) are shown below but in the invention, they are not limited to these.

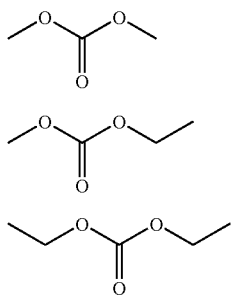

2-1

2-2

2-3

Of compounds of formula (1) and formula (2), above-exemplified compounds (1-1), (1-2) and (2-3) are specifically preferred.

The compound of formula (1) or formula (2) is one kind of electrolytic solvents but may be used in combination with other solvents within the range of not vitiating the object and effects of the invention. Specific examples of such solvents include tetramethylurea, sulfolane, dimethyl sulfoxide, 1,3-dimethyl-2-imidazolidinone, 2-(N-methyl)-2-pyrrolidinone, hexamethylphosphortriamide, N-methylpropionamide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethyl acetate, ethyl propionate, dimethoxy ethane, diethoxyfuran, tetrahydrofuran, ethylene glycol, diethylene glycol, triethylene glycol monobutyl ether, and water. Of these solvents described above, it is preferred to contain at least one solvent exhibiting a freezing point of not more than −20° C. and a boiling point of not less than 120° C.

Other solvents usable in the invention include those shown in, for example, J. A. Riddick, W. B. Bunger, T. K. Sakano, "Organic Solvents", 4th ed., John Wiley & Sons (1986), Y. Marcus, "Ion Solvation", John Wiley & Sons (1985), C. Reichardt, "Solvents and Solvent Effects in Chemistry", 2nd ed., VCH (1988), G. J. Janz, R. P. T. Tomkins, "Nonaqueous Electorlytes Handbook", Vol. 1, Academic Press (1972).

In the invention, the electrolytic solvent may be single specie or a mixture of solvents, but a mixed solvent containing ethylene carbonate. The content of ethylene carbonate is preferably not less than 10% by mass and not more than 90% by mass. Specifically preferred electrolytic solvents are a mixed solvent having a mass ratio of propylene carbonate/ethylene carbonate of from 7/3 to 3/7. A propylene carbonate ratio of more than 7/3 results in deteriorated ionic conductivity and lowered response speed, and a propylene carbonate ratio of less than 3/7 easily forms precipitates at a low temperature.

In formula (3), $R_7$ and $R_8$ are each a substituted or unsubstituted hydrocarbon group, which includes an aromatic straight chain or branched group. The hydrocarbon group may contain at least one nitrogen atom, oxygen atom, phosphorus atom, a sulfur atom and a halogen atom, provided that when forming a S-containing ring, it is not an aromatic group. Further, atoms adjacent to the S atom are not S.

Examples of a group capable of being substituted on the hydrocarbon group include an amino group, a guanidine group, a quaternary ammonium group, a hydroxy group, a halogen compound, a carboxylic acid group, a carboxylate group, an amido group, a sulfinic acid group, a sulfonic acid group, a sulfate group, a phosphonic acid group, a phosphate group, a nitro group and a cyano group.

In general, to cause solution and deposition of silver, it is necessary to solubilize silver in the electrolyte. For instance, it is general that a compound having a chemical structure specie exhibiting interaction with silver through weak covalent bonding to silver renders silver or a compound containing silver soluble. As such a chemical structure specie are known a halogen atom, a mercapto group, a carboxyl group and an imino group. In the invention, a thio-ether group also effectively acts as a solvent for silver, exerts little effect on co-existing compounds and exhibits high solubility in a solvent.

Specific examples of the compound of formula (3) are shown below but are by no means limited to these.

| | | | |
|---|---|---|---|
| CH$_3$SCH$_2$CH$_2$OH | 3-1 | HOCH$_2$CH$_2$SCH$_2$CH$_2$OH | 3-2 |
| HOCH$_2$CH$_2$SCH$_2$CH$_2$SCH$_2$CH$_2$OH | 3-3 | HOCH$_2$CH$_2$SCH$_2$CH$_2$SCH$_2$CH$_2$SCH$_2$CH$_2$OH | 3-4 |
| HOCH$_2$CH$_2$SCH$_2$CH$_2$OCH$_2$CH$_2$OCH$_2$CH$_2$SCH$_2$CH$_2$OH | 3-5 | HOCH$_2$CH$_2$OCH$_2$CH$_2$SCH$_2$CH$_2$SCH$_2$CH$_2$OCH$_2$CH$_2$OH | 3-6 |
| H$_3$SCH$_2$CH$_2$COOH | 3-7 | HOOCCH$_2$SCH$_2$COOH | 3-8 |
| HOOCCH$_2$CH$_2$SCH$_2$CH$_2$COOH | 3-9 | HOOCCH$_2$SCH$_2$CH$_2$SCH$_2$COOH | 3-10 |
| | | | 3-12 |
| HOOCCH$_2$SCH$_2$CH$_2$SCH$_2$CH$_2$SCH$_2$CH$_2$SCH$_2$COOH | | HOOCCH$_2$CH$_2$SCH$_2$CH$_2$SCH$_2$CH(OH)CH$_2$SCH$_2$CH$_2$SCH$_2$CH$_2$COOH | |
| HOOCCH$_2$CH$_2$SCH$_2$CH$_2$SCH$_2$CH(OH)CH(OH)CH$_2$SCH$_2$CH$_2$SCH$_2$CH$_2$COOH | | | 3-13 |
| H$_3$CSCH$_2$CH$_2$CH$_2$NH$_2$ | 3-14 | H$_2$NCH$_2$CH$_2$SCH$_2$CH$_2$NH$_2$ | 3-15 |
| H$_2$NCH$_2$CH$_2$SCH$_2$CH$_2$SCH$_2$CH$_2$NH$_2$ | 3-16 | H$_3$CSCH$_2$CH$_2$CH(NH$_2$)COOH | 3-17 |
| H$_2$NCH$_2$CH$_2$OCH$_2$CH$_2$SCH$_2$CH$_2$SCH$_2$CH$_2$OCH$_2$CH$_2$NH$_2$ | 3-18 | H$_2$NCH$_2$CH$_2$SCH$_2$CH$_2$OCH$_2$CH$_2$OCH$_2$CH$_2$SCH$_2$CH$_2$NH$_2$ | 3-19 |
| H$_2$NCH$_2$CH$_2$SCH$_2$CH$_2$SCH$_2$CH$_2$SCH$_2$CH$_2$SCH$_2$CH$_2$NH$_2$ | 3-20 | HOOC(NH$_2$)CHCH$_2$CH$_2$SCH$_2$CH$_2$SCH$_2$CH$_2$CH(NH$_2$)COOH | 3-21 |

-continued 3-22
HOOC(NH$_2$)CHCH$_2$SCH$_2$CH$_2$OCH$_2$CH$_2$OCH$_2$CH$_2$SCH$_2$CH(NH$_2$)COOH 3-23
HOOC(NH$_2$)CHCH$_2$OCH$_2$CH$_2$SCH$_2$CH$_2$SCH$_2$CH$_2$OCH$_2$CH(NH$_2$)COOH 3-24
H$_2$N(═O)CCH$_2$SCH$_2$CH$_2$OCH$_2$CH$_2$OCH$_2$CH$_2$SCH$_2$C(═O)NH$_2$ 3-25
H$_2$N(O═)CCH$_2$SCH$_2$CH$_2$SCH$_2$C(O═NH$_2$ 3-26
H$_2$NHN(O═)CCH$_2$SCH$_2$CH$_2$SCH$_2$C(═O)NHNH$_2$ 3-27
H$_3$C(O═)NHCH$_2$CH$_2$SCH$_2$CH$_2$SCH$_2$CH$_2$NHC(O═)CH$_3$ 3-28
H$_2$NO$_2$SCH$_2$CH$_2$SCH$_2$CH$_2$SCH$_2$CH$_2$SO$_2$NH$_2$ 3-29
NaO$_3$SCH$_2$CH$_2$CH$_2$SCH$_2$CH$_2$SCH$_2$CH$_2$CH$_2$SO$_3$Na 3-30
H$_3$CSO$_2$NHCH$_2$CH$_2$SCH$_2$CH$_2$SCH$_2$CH$_2$NHO$_2$SCH$_3$ 3-31
H$_2$N(NH)CSCH$_2$CH$_2$SC(NH)NH$_2$·2HBr 3-32
H$_2$(NH)CSCH$_2$CH$_2$OCH$_2$CH$_2$OCH$_2$CH$_2$SC(NH)NH$_2$·2HCl 3-33
H$_2$N(NH)CNHCH$_2$CH$_2$SCH$_2$CH$_2$SCH$_2$CH$_2$NHC(NH)NH$_2$·2HBr 3-34
[(CH$_3$)$_3$NHCH$_2$CH$_2$SCH$_2$CH$_2$SCH$_2$CH$_2$N(CH$_3$)$_3$]$^{2+}$·2Cl$^-$ 3-35
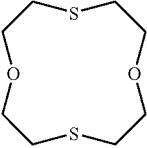

3-36
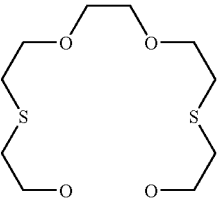

3-37
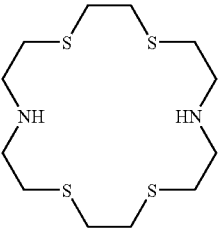

3-38
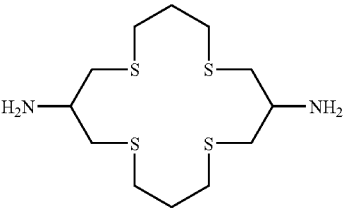

3-39
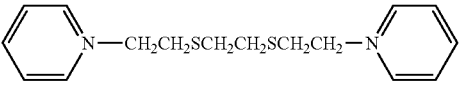

3-40
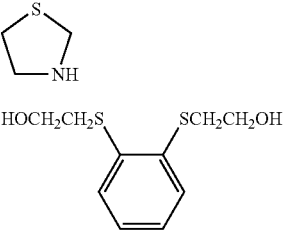

3-41
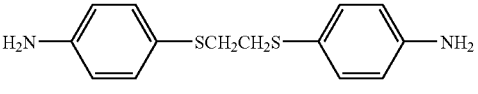

3-42
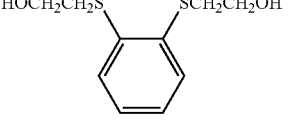

3-43
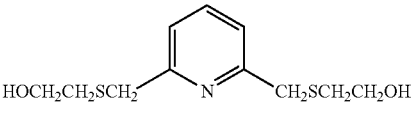

3-44
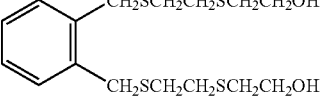

3-45
HOOCCH$_2$SCH$_2$CH$_2$SCH$_2$—⬡—CH$_2$SCH$_2$CH$_2$SCH$_2$COOH 3-46
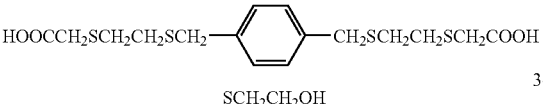

3-47
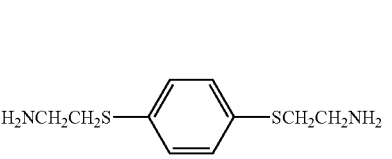

Of the foregoing compound, compound 3-2 is specifically preferred to achieve the objective effects of the invention.

Next, there will be described a compound represented by formula (4).

In the formula (4), M is a hydrogen atom, a metal atom or a quaternary ammonium; Z is a nitrogen-containing heterocyclic ring; n is an integer of 0 to 5; R$_9$ is a hydrogen atom, a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxycarbonyl group, a carboxyl group, a carbonyl group, a sulfonyl group, an amino group, a hydroxy group or a heterocyclic group, provided that when n is 2 or more, $R_9$s may be the same or different.

Examples of a metal atom represented by M of formula (4) include Li, Na, K, Mg, Ca, Zn and Ag. Examples of a quaternary ammonium include $NH_4$, $N(CH_3)_4$, $N(C_4H_9)_4$, $N(CH_3)_3C_{12}H_{25}$ and $N(ch_3)_3CH_2C_6H_5$.

Examples of a nitrogen-containing heterocyclic ring represented by Z of formula (4) include a tetrazole ring, a triazole ring, an imidazole ring, an oxazole ring, a thiazole ring, an indole ring, an oxazole ring, a benzoxazole ring, a benzimidazole ring, a benzthiazole ring, a benzoselenazole ring and a naphthoxazole ring.

Examples of a halogen atom represented by $R_4$ of formula (4) include a fluorine atom, chlorine atom, a bromine atom and iodine atom; examples of an alkyl group include methyl, ethyl, propyl, I-propyl, t-butyl, pentyl, cyclopentyl, hexyl, cyclohexyl, octyl, dodecyl, hydroxyethyl, methoxyethyl, trifluoromethyl, and benzyl; examples of an aryl group include phenyl and naphthyl; examples of an alkylcarbonamide group include acetylamino, propionylamino and butyloylamino; examples of anarylcarbonamido group include benzoylamino; examples of an alkylsulfoneamido group include methanesulfonylamino and ethanesulfonylamino; examples of an arylsulfoneamido group include benzenesulfonylamino and toluenesulfonylamino; examples of an aryloxy group include phenoxy; examples of an alkylthio group include methylthio, ethylthio, and butylthio; examples of an arylthio group include phenylthio and tolylthio; examples of an alkylcarbamoyl group include methylcarbamoyl, dimethylcarbamoyl, ethylcarbamoyl, dimethylcarbamoyl, dibutylcarbamoyl, piperidylcarbamoyl and morpholylcarbamoyl; examples of anarylcarbamoyl group include phenylcarbamoyl, methylphenylcarbamoyl, ethylphenylcarbamoyl, and benzylphenylcarbamoyl; examples of an alkylsulfamoyl group include methylsulfamoyl, dimethylsulfamoyl, ethylsulfamoyl, diethylsulfamoyl, dibutylsulfamoyl, piperidylsulfamoyl and morpholylsulfamoyl; examples of an arylsulfamoyl group include phenylsulfamoyl, methylphenylsulfamoyl, ethylphenylsulfamoyl, and benzylphenylsulfamoyl; examples of an alkylsulfonyl group include methanesulfonyl, and ethanesulfonyl; examples of an arylsulfonyl group include phenylsulfonyl, 4-chlorophenylsulfonyl and p-toluenesulfonyl; examples of an alkoxycarbonyl group include methoxycarbonyl, ethoxycarbonyl, and butoxycarbonyl; examples of an aryloxycarbonyl group include phenoxycarbonyl; examples of an alkylcarbonyl group include acetyl, propionyl, and butyloyl; examples of an arylcarbonyl group include benzoyl, and alkylbenzoyl; examples of an acyloxy group include acetyloxy, propionyoxy and bytyloyloxy; and examples of a heterocyclic group include an oxazole ring, thiazole ring, triazole ring, selenazole ring, tetrazole ring, oxazole ring, thiadiazole ring, thiazine ring, triazine ring, benzoxazole ring, benzthiazole ring, indolenine ring, benzoselenazole ring, naphthothiazole ring, triazaindolidine ring diazaindolidine ring, and tetrazaindolidine. These substituent groups may further be substituted by the foregoing substituent groups.

Specific examples of the compound of formula (4) are shown below but are by no means limited to these.

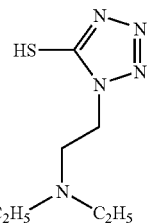

4-1

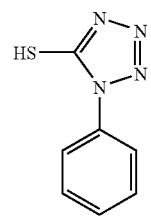

4-2

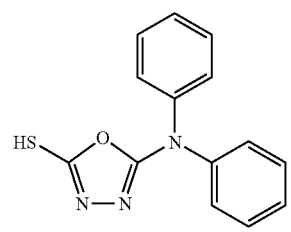

4-3

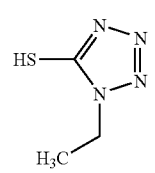

4-4

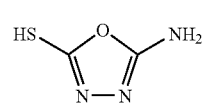

4-5

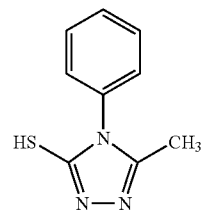

4-6

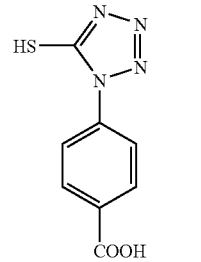

4-7

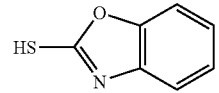

4-8

-continued

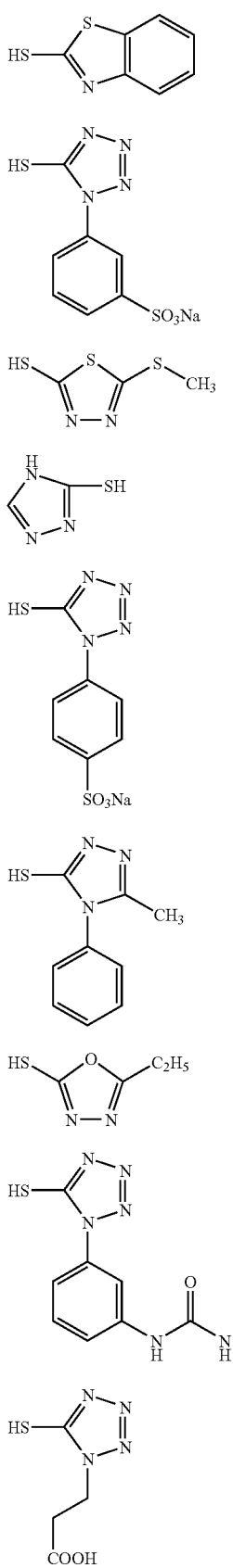

4-9
4-10
4-11
4-12
4-13
4-14
4-15
4-16
4-17

-continued

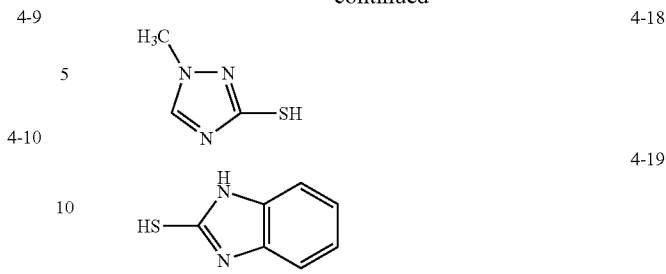

4-18
4-19

Of the foregoing compounds, exemplified compounds 4-12 and 4-18 are specifically preferred in terms of achieving the targeted effects of the invention.

The display element of the invention preferably satisfies the requirement:

$$0 \leq [X]/[Ag] \leq 0.01$$

wherein [X] is a molar concentration (mole/kg) of halogen ions or halogen atoms contained in the electrolyte layer and [Ag] is a molar concentration (mole/kg) of silver or a compound containing a silver in the molecule, contained in the electrolyte layer.

The halogen atoms relating to the invention refer to iodine atoms, chlorine atoms, bromine atoms or fluorine atoms. A ratio [X]/[Ag] of more than 0.01 produces $X^- \rightarrow X_2$ in an oxidation-reduction reaction of silver and the produced $X_2$ readily cross-oxidizes black silver to allow dissolution of the black silver, becoming one of factors resulting in reduced memory capacity. The molar concentration ratio of halogen atom to silver is preferably as low as possible. In the invention it is more preferably $0 \leq [X]/[Ag] \leq 0.001$. When adding halogen ions, the sum of halogen species molar concentration is preferably in the order of [I]<[Br]<[Cl]<[F], in terms of enhanced memory.

Electrolyte/Silver Salt

In the display element of the invention are usable commonly known silver salt compounds, such as silver iodide, silver chloride, silver bromide, silver oxide, silver sulfide, silver citrate, silver acetate, silver behenate, silver p-toluenesulfonate, silver salts of mercapto-compounds and silver complexes with iminodiacetic acids. Of these silver salts, silver salts of a halogen, a carboxylic acid or a compound not containing a nitrogen atom capable of coordinating with silver are preferred, such as silver p-toluenesulfonate.

The concentration of silver ions contained in the electrolyte layer relating to the invention is preferably 0.2 mol/kg≦[Ag]2.0 mol/kg.

A silver ion concentration of less than 0.2 mol/kg becomes a dilute silver solution, retarding the driving speed. A silver ion concentration of more than 2.0 mol/kg deteriorates solubility and disadvantageously tends to cause precipitation during storage at a low temperature.

Electrolyte Material

In the display element of the invention, a liquid electrolyte can contain therein compounds as below. Listed as potassium compounds are KCl, KI, and KBr; listed as lithium compounds are $LiBF_4$, $LiClO_4$, $LiPF_6$, and $LiCF_3SO_3$; while listed as tetraalkylammonium compounds are tetraethylammonium perchlorate, tetrabutylammonium perchlorate, tetraethylammonium borofluoride, tetrabutylammonium borofluoride, and tetrabutylammonium halide. In addition, there are preferably used fused salt electrolyte compositions described in paragraphs [0062]-[0081] of JP-A No. 2003-187881. Further, there are also usable compounds which form oxidation-reduction pairs such as $I^-/I_3^-$, $Br^-/Br_3^-$ and quinone/hydroquinone.

Further, a solid electrolyte can contain therein compounds exhibiting electronic or ionic conductivity, as described below.

Examples of such compounds include fluorinated vinyl based polymers containing perfluorosulfonic acid, polythiophene, polyaniline, polypyrrole, triphenylamines, polyvinylcarbazoles, polymethylphenylsilanes, calcogenides such as $Cu_2S$, $Ag_2S$, $Cu_2Se$, and $AgCrSe_2$, fluorine compounds such as $CaF_2$, $PbF_2$, $SrF_2$, $LaF_3$, $TlSn_2F_5$, and $CeF_3$, lithium salts such as $Li_2SO_4$ and $Li_4SiO_4$ and compounds such as $ZrO_2$, $CaO$, $Cd_2O_3$, $HfO_2$, $Y_2O_3$, $Nb_2O_5$, $WO_3$, $Bi_2O_3$, AgBr, AgI, CuCl, CuBr, CuBr, CuI, LiI, LiBr, LiCl, $LiAlCl_4$, $LiAlF_4$, AgSBr, $C_5H_5NHAg_5I_6$, $Rb_4Cu_{16}I_7Cl_{13}$, $Rb_3Cu_7Cl_{10}$, LiN, $Li_5NI_2$, and $Li_6NBr_3$.

There may be employed, as supporting electrolytes, electrolytes in gel form. When electrolytes are nonaqueous, there may be used oil gelling agents described in paragraphs [0057]-[0059] of JP-A No. 11-185836.

Thickening Agents to be Added to the Electrolyte Layer

In the display element of the invention, there may be used thickening agents in the electrolyte layer. Examples thereof include gelatin, gum Arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly(acrylic acid), poly(methylmethacrylic acid), poly(vinyl chloride), poly(methacrylic acid), copoly(styrene-maleic anhydride), copoly(styrene-acrylonitrile), copoly(styrene-butadiene), poly(vinyl acetals) (for example, poly(vinyl formal), poly(vinyl butyral)), poly(vinyl esters), poly(urethanes), phenoxy resins, poly(vinylidene chloride), poly(epoxides), poly(carbonates), poly(vinyl acetate), cellulose esters, poly(amides), as well as polyvinyl butyral, cellulose acetate, cellulose acetate butyrate, polyester, polycarbonate, poly(acrylic acid), and polyurethane as a transparent hydrophobic binder.

These thickening agents may be used in combination. There are further cited the compounds described on pages 71-75 of JP-A No. 64-13546. Of these, polyvinyl alcohols, polyvinylpyrrolidones, hydroxypropyl celluloses, and polyalkylene glycols are preferably used in terms of compatibility with various types of additives and enhancement of dispersion stability of white particles.

Other Additives to the Electrolyte Layer

Auxiliary layers of the display element of the invention include a protective layer, a filter layer, an antihalation layer, a crossover light cutting layer, and a backing layer. These auxiliary layers may contain chemical sensitizers, noble metal sensitizers, photosensitive dyes, supersensitizers, high boiling point solvents, antifoggants, stabilizers, development inhibitors, bleach accelerators, fixing accelerators, color mixing inhibitors, formalin scavengers, toners, hardeners, surface active agents, thickening agents, plasticizers, lubricants, UV absorbents, anti-irradiation dyes, filter light absorbing dyes, fungicides, polymer latexes, heavy metals, antistatic agents, and matting agents.

The additives described above are detailed in Research Disclosure (hereinafter denoted simply as RD) Volume 176 Item/17643 (December 1978), RD Volume 184 Item/18431 (August 1979), DR Volume 187 Item/18716 (November 1979), and RD Volume 308 Item/308119 (December 1989).

Types of compounds cited in RD are listed below.

| Additives | RD 17643 Page | RD 17643 Section | RD 18716 Page | RD 18716 Section | RD 30 Page | RD 30 Section |
|---|---|---|---|---|---|---|
| Chemical Sensitizers | 23 | III | 648 | right top | 96 | III |
| Sensitizing Dyes | 23 | IV | 648-649 | | 996-8 | IV |
| Desensitizing Dyes | 23 | IV | | | 998 | IV |
| Dyes | 25-26 | VIII | 649-650 | | 1003 | VIII |
| Development Accelerators | 29 | XXI | 648 | right top | | |
| Antifoggant Stabilizer | 24 | IV | 649 | right top | 1006-7 | VI |
| Optical Brightening Agents | 24 | V | | | 998 | V |
| Hardeners | 26 | X | 651 | left | 1004-5 | X |
| Surfactants | 26-7 | XI | 650 | right | 1005-6 | XI |
| Antistatic Agents | 27 | XII | 650 | right | 1006-7 | XIII |
| Plasticizers | 27 | XII | 650 | right | 1006 | XII |
| Lubricants | 27 | XII | | | | |
| Matting Agents | 28 | XVI | 650 | right | 1008-9 | XVI |
| Binders | 26 | XXII | | | 1003-4 | IX |
| Supports | 28 | XVII | | | 1009 | XVII |

Layer Configuration

The layer configuration between opposed electrodes related to the display element of the invention will now be described in more detail.

As the layer configuration related to the display element of the invention, it is possible to arrange a constituting layer containing positive hole transport materials. Examples of positive hole transport materials include aromatic amines, triphenylene derivatives, oligochiophene compounds, polypyrroles, polyacetylene derivatives, polyphenylene vinylene derivatives, polythienylene vinylene derivatives, polythiophene derivatives, polyaniline derivatives, polytoluidine derivatives, CuI, CuSCN, $CuInSe_2$, $Cu(In,Ga)Se$, $CuGaSe_2$, $Cu_2O$, CuS, $CuGaS_2$, $CuInS_2$, $CuAlSe_2$, GaP, NiO, CoO, FeO, $Bi_2O_3$, $MoO_2$, and $Cr_2O_3$.

Substrates

There are preferably employed as substrates usable in the invention plastic films composed of polyolefins such as polyethylene or polypropylene, polycarbonates, cellulose acetate, polyethylene terephthalate, polyethylene dinaphthalene dicarboxylate, polystyrene naphthalates, polyvinyl chloride, polyimide, polyvinyl acetals, and polystyrene. In addition, preferred are syndioctatic structure polystyrenes. These are prepared employing the methods described, for example, in each of JP-A Nos. 62-117708, 1-46912, and 1-178505. Further, examples of supports include metal substrates including stainless steel, paper supports such as baryta paper or resin coated paper, supports including the above plastic film having thereon a reflection layer, and those which are described in JP-A No. 62-253195 (pages 29-31) as a support. There are also preferably used those described on page 28 of RD No. 17643, from the right column to the left column on page 648 of RD No. 18716, and on page 879 of RD No. 307105. As described in U.S. Pat. No. 4,142,735, these supports may be subjected to a thermal treatment at a temperature lower than Tg so that core-set curl is decreased. Further, the surface of these supports may be subjected to a surface treatment with the aim of enhancement of adhesion of the support to other constituting layers. In the invention, there may be employed as surface treatments a glow discharge treatment, an ultraviolet radiation irradiation treatment, a corona treatment and a flame treatment. Further there may be employed supports described on pages 44-149 of Kochi Gijutsu No. 5 (published by AZTEC Corp., dated Mar. 22, 1991). There are further cited "Supports" described on page 1009 of RD No. 308119 and on page 108 of Product Licensing Index Volume 92. In addition, there are also usable glass substrates and epoxy resins kneaded with glass powder.

Electrode

In the display element of the invention, it is preferable that at least one of the opposed electrodes is a metal electrode. There may be employed, as a metal electrode, metals such as platinum, gold, silver, copper, aluminum, zinc, nickel, titanium, or bismuth and alloys thereof, which are known in the art. Preferred metals employed in the metal electrodes are those which exhibit a work function near the oxidation-reduction potential of silver in electrolytes. Of these, a silver electrode or an electrode having a silver content of at least 80 percent is advantageous to maintain a reduced state of silver, which also is superior in anti-staining of electrodes. Methods for preparing electrodes can employ conventional ones such as a evaporating method, a printing method, an ink-jet method, a spin coating method, and a CVD method.

Further, the display element of the invention preferably comprises a transparent electrode as at least one of the opposed electrodes. Transparent electrodes are not particularly limited so far as they are transparent and electrically conductive. Examples thereof include indium tin oxide (ITO), indium zinc oxide (IZO), tin oxide (FTO), indium oxide, zinc oxide, platinum, gold, silver rhodium, copper, chromium, carbon, aluminum, silicon, amorphous silicon, and BSO (bismuth silicon oxide). Such electrodes as described above can be formed, for example, in the manner that an ITO layer may be subjected to mask evaporation on a substrate employing a sputtering method, or after forming an ITO layer on the entire surface, patterning may be performed employing a photolithographic method. The surface resistance value is preferably 100 $\Omega$/sq or less, and is more preferably 10 $\Omega$/sq or less. The thickness of the transparent electrodes is not particularly limited but is commonly 0.1-20 µm.

Other Components Constituting the Display Element

The display element of the invention may optionally employs sealing agents, column-structured materials, and spacer particles.

Sealing agents are those to seal materials so that they do not leak out. There may be employed, as sealing agents, heat curing, light curing, moisture curing, and anaerobic curing resins such as epoxy resins, urethane resins, acryl resins, vinyl acetate resins, ene-thiol resins, silicone resins, or modified polymer resins.

Columnar structure materials provides strong self-supporting (strength) between substrates. Examples thereof include a cylindrical form, a quadrangular form, an elliptic cylindrical form, and a trapezoidal form, which are arranged at definite intervals in a specified pattern such as a lattice. Further, there may be employed stripe-shaped ones arranged at definite intervals. It is preferable that the columnar structure materials are not randomly arranged but arranged at an equal distance, arranged so that the interval gradually varies, or a predetermined pattern is repeated at a definite cycle so that the distance between substrates is appropriately maintained and image display is not hindered. When 1 to 40% of the display region of a display element is accounted for by the columnar structure materials, sufficient strength for commercial viability is achieved as a display element.

There may be provided a spacer between paired substrates to maintain a uniform gap between them. Examples of such a spacer include spherical materials composed of resins or inorganic oxides. Further, adhesion spacers are suitably employed the surface of which is coated with thermoplastic resins. In order to maintain the uniform gap between substrates, there may be provided only columnar structure materials. However, there may be provided both spacers and columnar structure materials. In place of the columnar structure materials, only spacers may be employed as a space-holding member. The diameter of spacers, when a columnar structure material is formed, is not more than its height, and is preferably equal to the height. When the column-structured material is not formed, the diameter of spacers corresponds to the distance of the cell gap.

Screen Printing

In the invention, sealing agents, columnar structure materials, and electrode patterns can be formed employing a screen printing method. In screen printing methods, a screen on which predetermined patterns are formed is covered on the electrode surface, and printing materials (compositions to form column-structured materials such as light-curing resins) are placed on the screen. Subsequently, a squeegee is moved at a predetermined pressure, angle and rate, whereby the printing materials are transferred onto the above substrate via the pattern of the screen. Then, the transferred materials are thermally cured and dried. When columnar structure materials are formed employing the screen printing method, resin materials are not limited to light-curable resins, but there may also employed, for example, heat curable resins such as epoxy resins or acryl resins and thermoplastic resins. Examples of thermoplastic resin include a polyvinyl chloride resin, a polyvinylidene chloride resin, a polyvinyl acetate resin, a polymethacrylic acid ester resin, a polyacrylic acid ester resin, a polystyrene resin, a polyamide resin, a polyethylene resin, a polypropylene resin, a fluorocarbon resin, a polyurethane resin, a polyacrylonitrile resin, a polyvinyl ether resin, a polyvinyl ketone resin, a polyether resin, a polyvinyl pyrrolidone resin, a saturated polyester resin, a polycarbonate resin, and a chlorinated polyether resin. It is preferable that resin materials are employed in the form of a paste obtained through, for example, solution in suitable solvents.

As noted above, after forming the columnar structure materials on the substrate, spacers are provided on at least one side of the substrate, and paired substrates are placed so that the electrode forming surfaces are opposed to each other, whereby an empty cell is formed. By heating the paired opposing substrates, they are allowed to adhere to each other under application of pressure from both sides, whereby a display cell is obtained. Preparation of a display element may be performed by injecting an electrolyte composition between the substrates, employing a vacuum injection method. Alternatively, during adhesion of substrates, an electrolyte composition may be dripped on the surface of one of the substrates and then simultaneously sealed when the substrates are allowed to adhere to each other.

Driving Method of Display Element

In the display element of the invention, it is preferred to perform a driving operation such that black silver is allowed to be deposited by applying a voltage more than the deposition overpotential and deposition of black silver continues with applying a voltage not more than the deposition overpotential. Performing such a driving operation results in reduction of write energy, reduced load of the drive circuit and enhanced writing speed. Existence of overpotential in the electrode reaction is generally known in the field of electrochemistry. The overpotential is detailed in, for example, "Chemistry of Electron Transfer/Introduction of Electrochemistry" (1996, published by Asakura Shoten) on page 121. The display element of the invention is regarded as an electrode reaction of an electrode and silver within an electrolyte so that existence of an overpotential in dissolution and deposition of silver is readily understand. Since the magnitude of an overpotential controls an exchange current density, from the fact that after formation of black silver, deposition of black silver can be continued by voltage application of not more than a deposition overpotential, it is assumed that the surface of black silver can readily perform electron injection at lower excess energy.

Commercial Application

It is feasible to apply the display element of the invention to ID card related fields, public information related fields, transportation related fields, broadcasting related fields, account settling fields, and distribution and logistics related fields. Specific examples include door keys, student identification cards, corporate member identification cards, various club membership cards, convenience store cards, department store cards, vending machine cards, gas station cards, subway and railroad cards, bus cards, cash cards, credit cards, highway cards, driver licenses, hospital medical examination cards, health insurance cards, residents' basic registers and passports.

What is claimed is:

1. A display element comprising opposing electrodes having therebetween an electrolyte containing silver or a compound having silver in the chemical structure, wherein the opposing electrodes are driven by a drive circuit disposed for each of pixels so that the silver is dissolved and deposited and the opposing electrodes are provided on a plane separate from the drive circuit, and the electrolyte comprises at least one compound represented by formula (1) or (2) and at least one compound represented by formula (3) or (4):

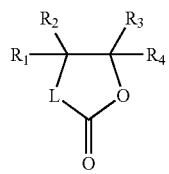

formula (1)

wherein L is an oxygen atom or $CH_2$; $R_1$ through $R_4$ are each a hydrogen atom, an alkyl group, an alkenyl group, an aryl group, a cycloalkyl group, an alkoxyalkyl group or an alkoxy group;

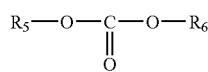

formula (2)

wherein $R_5$ and $R_6$ are each a hydrogen atom, an alkyl group, an alkenyl group, an aryl group, a cycloalkyl group, an alkoxyalkyl group or an alkoxy group;

formula (3)

wherein $R_7$ and $R_8$ are each a substituted or unsubstituted hydrocarbon group, or $R_7$ or $R_8$ combine with each other to form a nonaromatic S-containing ring, provided that atoms adjacent to S are not S;

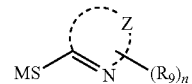

formula (4)

wherein M is a hydrogen atom, a metal atom or a quaternary ammonium; Z represents a nitrogen-containing heterocyclic ring; n is an integer of 0 to 5; $R_9$ is a hydrogen atom, a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxycarbonyl group, a carboxyl group, a carbonyl group, a sulfonyl group, an amino group, a hydroxy group or a heterocyclic group, provided that when n is 2 or more, $R_9$s may be the same or different or may combine to form a condensed ring.

2. The display element of claim 1, wherein at least one of the opposing electrodes is electrically connected to the drive circuit through a contact hole.

3. The display element of claim 1, wherein the drive circuit has a pixel switching means.

4. The display element of claim 1, wherein the drive circuit has a current controller to control a current passing between the opposing electrodes.

5. The display element of claim 1, wherein the drive circuit has a potential controller to control a potential between the opposing electrodes.

6. The display element of claim 1, wherein the drive circuit has a means for specifying rewriting.

7. The display element of claim 1, wherein the drive circuit has a power cutoff means.

8. The display element of claim 1, wherein the display element has a porous white scattering layer between the opposing electrodes.

9. The display element of claim 1, wherein a distance between the opposing electrodes is not less than 1 μm and not more than 40 μm.

10. The display element of claim 1, wherein an area of a black image per pixel is from 1.3 to 3.5, based on an area of an opposing electrode that is not on an image observation side being 1.

11. A display element comprising opposing electrodes having therebetween an electrolyte containing silver or a compound having silver in the chemical structure, wherein the opposing electrodes are driven by a drive circuit disposed for each of pixels so that the silver is dissolved and deposited and the opposing electrodes are provided on a plane separate from the drive circuit, and the display element satisfies equation (1):

$$0 \leq [X]/[Ag] \leq 0.01 \qquad \text{equation (1)}$$

wherein [X] is a molar concentration (mole/kg) of halogen ions or halogen atoms contained in the electrolyte and [Ag] is a total molar concentration (mole/kg) of silver contained in the electrolyte or silver included in the compound including silver in its chemical structure.

12. The display element of claim 11, wherein at least one of the opposing electrodes is electrically connected to the drive circuit through a contact hole.

13. The display element of claim 11, wherein the drive circuit has a pixel switching means.

14. The display element of claim 11, wherein the drive circuit has a current controller to control a current passing between the opposing electrodes.

15. The display element of claim 11, wherein the drive circuit has a potential controller to control a potential between the opposing electrodes.

16. The display element of claim 11, wherein the drive circuit has a means for specifying rewriting.

17. The display element of claim 11, wherein the drive circuit has a power cutoff means.

18. The display element of claim 11, wherein the display element has a porous white scattering layer between the opposing electrodes.

19. The display element of claim 11, wherein a distance between the opposing electrodes is not less than 1 μm and not more than 40 μm.

20. The display element of claim 11, wherein an area of a black image per pixel is from 1.3 to 3.5, based on an area of an opposing electrode that is not on an image observation side being 1.

21. A display element comprising opposing electrodes having therebetween an electrolyte containing silver or a compound having silver in the chemical structure, wherein the opposing electrodes are driven by a drive circuit disposed for each of pixels so that the silver is dissolved and deposited and the opposing electrodes are provided on a plane separate from the drive circuit, and the opposing electrodes are driven so that a blackened silver is deposited by applying a voltage more than a deposition overvoltage and deposition of the blackened silver is continued by applying a voltage not more than the deposition overvoltage.

22. The display element of claim 21, wherein at least one of the opposing electrodes is electrically connected to the drive circuit through a contact hole.

23. The display element of claim 21, wherein the drive circuit has a pixel switching means.

24. The display element of claim 21, wherein the drive circuit has a current controller to control a current passing between the opposing electrodes.

25. The display element of claim 21, wherein the drive circuit has a potential controller to control a potential between the opposing electrodes.

26. The display element of claim 21, wherein the drive circuit has a means for specifiying rewriting.

27. The display element of claim 21, wherein the drive circuit has a power cutoff means.

28. The display element of claim 21, wherein the display element has a porous white scattering layer between the opposing electrodes.

29. The display element of claim 21, wherein a distance between the opposing electrodes is not less than 1 μm and not more than 40 μm.

30. The display element of claim 21, wherein an area of a black image per pixel is from 1.3 to 3.5, based on an area of an opposing electrode that is not an image observation side being 1.

* * * * *